United States Patent
Hellenga et al.

(10) Patent No.: US 6,314,462 B1
(45) Date of Patent: Nov. 6, 2001

(54) SUB-ENTRY POINT INTERFACE ARCHITECTURE FOR CHANGE MANAGEMENT IN A COMPUTER NETWORK

(75) Inventors: David Allan Hellenga; Mary Kim Majikes, both of Endwell; Thomas Michael Mooney, Vestal; Brian Douglas Valentine, Endwell, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/910,858

(22) Filed: Aug. 13, 1997

Related U.S. Application Data

(63) Continuation of application No. 07/543,603, filed on Jun. 25, 1990, now abandoned.

(51) Int. Cl.[7] .................................................. G06F 15/173
(52) U.S. Cl. ........................................ 709/224; 717/11
(58) Field of Search ................................ 709/224; 717/11

(56) References Cited

U.S. PATENT DOCUMENTS 5,084,816 * 1/1992 Boese et al. ........................ 395/575
5,089,954 * 2/1992 Rago ................................... 395/800

FOREIGN PATENT DOCUMENTS

A0290924   11/1988   (EP) .

OTHER PUBLICATIONS

*Data and Computer Communications*, by Stallings, pp. 400–403, 1985.*
IBM Systems Journal, vol. 28, No. 2, 1989, pp. 260–273, XP212406, Ballard et al., "Managing Changes in SNA Networks", Armonk, New York.
IBM Systems Journal, vol. 27, No. 1, 1988, pp. 32–44, Ahmadi et al., "Netview/PC", Armonk, New York.
IBM Systems Journal, vol. 28, No. 2, 1989, "Managing Changes In SNA Networks", C. P. Ballard et al., pp 260–273.
IBM Systems Journal, vol. 28, No. 2, 1989, "System–Independent File Management and Distribution Services", J.C. Ashfield et al., pp 241–259.
IBM Systems Journal, vol. 27, No. 1, 1988, "SNA Network Management Directions", D.B. Rose et al., pp 13–14.

* cited by examiner

Primary Examiner—John A. Follansbee
(74) Attorney, Agent, or Firm—McGuireWoods, LLP; Arthur J. Samodovitz

(57) ABSTRACT

This invention relates generally to communications with distributed nodes in a computer network, and more specifically with change management in a computer network.

5 Claims, 11 Drawing Sheets

| | |
|---|---|
| SEND | USE THIS FUNCTION TO DELIVER A SPECIFIC DATA OBJECT OR LOGICAL FILE GROUP FROM THE NETWORK TO A TARGET SYSTEM. |
| DELETE | USE THIS FUNCTION TO REMOVE DATA OBJECTS FROM A SYSTEM THAT ARE NO LONGER REQUIRED, OR MUST BE DELETED TO ALLOW SPACE FOR FUTURE UPDATES. |
| RETRIEVE | USE THIS FUNCTION TO RETURN A COPY OF THE REQUESTED DATA OBJECT TO THE FOCAL POINT (HOST APPLICATION) FOR STORAGE IN THE NDM RESOURCE REPOSITORY. |
| INSTALL | USE THIS FUNCTION TO GIVE SYSTEM THE ABILITY TO USE THE RECEIVED DATA OBJECTS. |
| ACCEPT | USE THIS FUNCTION TO MAKE A DATA OBJECT PERMANENT THAT WAS PREVIOUSLY INSTALLED WITH REMOVABILITY. THE CANONICAL NAME IN THIS FUNCTION MUST BE THE SAME CANONICAL NAME THAT WAS USED IN THE INSTALL FUNCTION. WHEN THE ACCEPT COMMAND IS PROCESSED, THE BACKUP LEVEL OF THE DATA OBJECT IS ERASED BY THE RECEIVING SYSTEM. |
| REMOVE | USE THIS FUNCTION TO REMOVE A DATA OBJECT FROM THE RECEIVING SYSTEM IF THE DATA OBJECT IS INSTALLED IN PRODUCTION WITH REMOVABILITY OR AS TRIAL. IF A BACKUP LEVEL VERSION OF THE DATA OBJECT IS PRESENT, THE RECEIVING SYSTEM USES THAT VERSION AS ITS PRODUCTION LEVEL. IF THE DATA OBJECT HAS COREQUISITES, THE REMOVE COMMAND CAUSES THAT DATA OBJECT AND ITS COREQUISITES TO BE REMOVED. |
| ACTIVATE | USE THIS COMMAND TO CAUSE THE RECEIVING SYSTEM TO PERFORM AN IML/IPL (INITIAL MICROCODE LOAD/INITIAL PROGRAM LOAD). |

FIG.2

| MICROCODE CATEGORIES MCODE | SYSTEM SPECIFIC CATEGORIES MCUST |
|---|---|
| SYSTEM MICROCODE<br>NLS MICROCODE (NATIONAL LANGUAGE SUPPORT)<br>I/O MICROCODE | ACTIVATE LOG<br>NETWORK HISTORY LOG<br>CANONICAL NAMES DIRECTORY<br>MCF DIRECTORY (MICROCODE FIX)<br>CONFIGURATION DATA |

FIG.3

| DATA OBJECT INSTALLATION STATES | |
|---|---|
| EMPTY (E) | NO DATA EXISTS IN THIS STATE. |
| UNLABELED (U) | THERE IS DATA FROM A PREVIOUS SEND FUNCTION, BUT THE DATA IS NOT YET INSTALLED. |
| PRODUCTION (P) | THE DATA OBJECT IS INSTALLED AS PRODUCTION. IT CONTAINS THE STABLE CODE LEVEL. |
| TRIAL (T) | THE DATA OBJECT IS INSTALLED AS TRIAL. THIS DATA OBJECT ALWAYS COEXISTS WITH A PRODUCTION DATA OBJECT, AND IT CONTAINS THE NEW CODE LEVEL WHOSE STABILITY IS UNKNOWN. |
| BACKUP (B) | WHEN A DATA OBJECT IS INSTALLED AS PRODUCTION WITH THE REMOVABILITY PARAMETER, THE PREVIOUS PRODUCTION DATA OBJECT BECOMES THE BACKUP (IT CONTAINS THE PREVIOUS STABLE CODE LEVEL). THE BACKUP AGAIN BECOMES PRODUCTION IF THE NEW PRODUCTION DATA OBJECT IS REMOVED. |

ALLOWABLE COMBINATIONS OF STATES
- EP
- BP
- TP
- UP
- UE (FOR NLS ONLY).

FIG.4

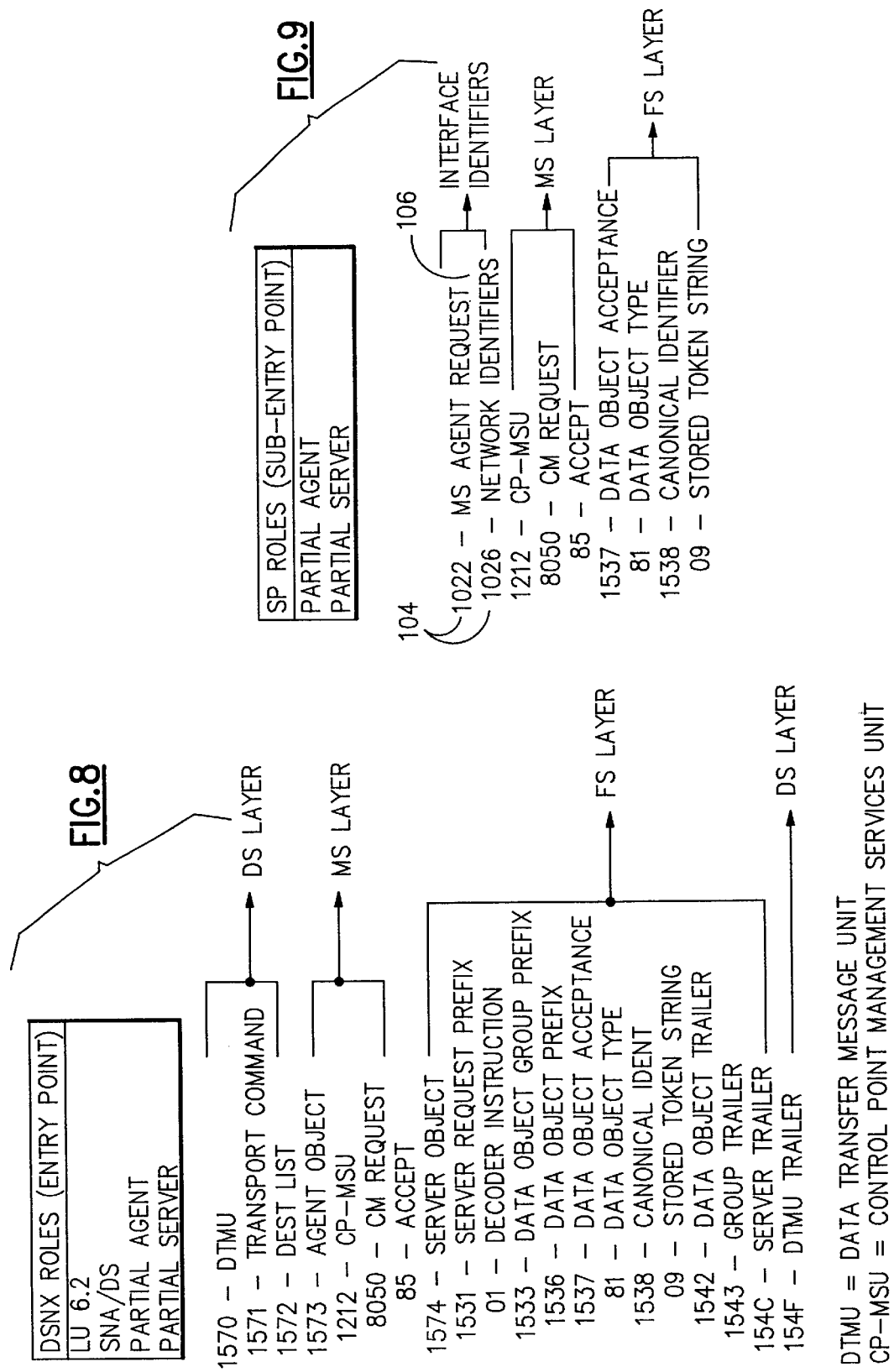

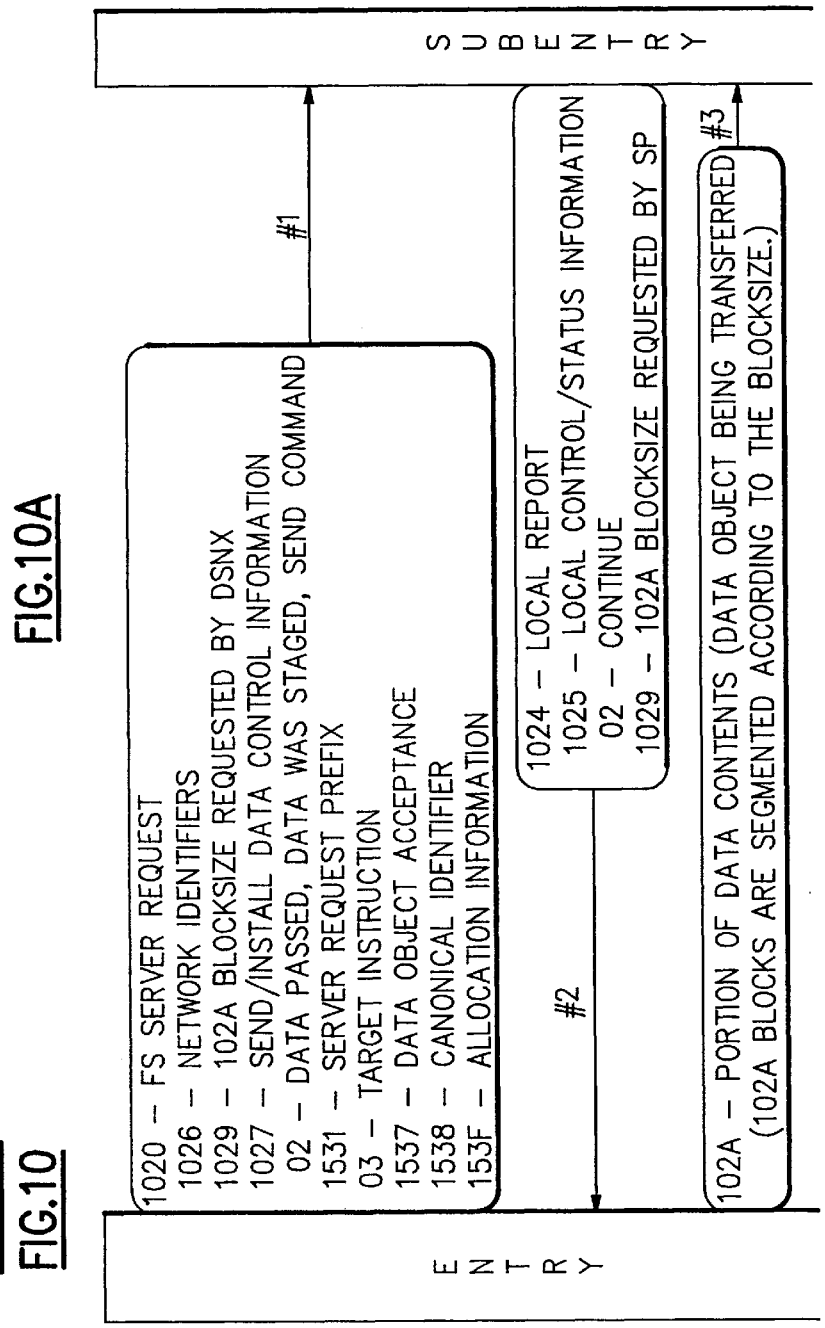

1020 — FS SERVER REQUEST
  1026 — NETWORK IDENTIFIERS
  1029 — BLOCKSIZE OF 102A REQUESTED BY DSNX
      (ONLY USED FOR SEND AND RETRIEVE REQUESTS)
  1027 — SEND/INSTALL DATA CONTROL INFORMATION
      (ONLY USED FOR SEND AND RETRIEVE REQUESTS)
  1531 — SERVER REQUEST PREFIX
  1537 — DATA OBJECT ACCEPTANCE
  1538 — CANONICAL IDENTIFIER
  153F — ALLOCATION INFORMATION

1021 — FS SERVER REPORT
  1025 — LOCAL CONTROL/STATUS INFORMATION
  1548 — ACTION SUMMARY
  1538 — CANONICAL IDENTIFIER

1022 — MS AGENT REQUEST
  1026 — NETWORK IDENTIFIERS
  1027 — SEND/INSTALL DATA CONTROL INFORMATION
  1212 — CP_MSU
   8050 — CHANGE MANAGEMENT REQUEST
  1537 — DATA OBJECT ACCEPTANCE
  1538 — CANONICAL IDENTIFIER

1023 — MS AGENT REPLY
  1025 — LOCAL CONTROL/STATUS INFORMATION
  1212 — CP_MSU
   0050 — CHANGE MANAGEMENT REPLY

1024 — LOCAL REPORT (USED FOR HANDSHAKING)
  1025 — LOCAL CONTROL/STATUS INFORMATION
  1029 — BLOCKSIZE OF 102A REQUESTED BY DSNX
      (ONLY USED FOR SEND AND RETRIEVE REQUESTS)

102A — DATA CONTENTS (FILE BEING TRANSFERRED)
  1541 — DATA

FIG.12

SUB-ENTRY POINT INTERFACE ARCHITECTURE FOR CHANGE MANAGEMENT IN A COMPUTER NETWORK

RELATED APPLICATIONS

This application is a continuation of U.S. patent application Ser. No. 07/543,603, filed on Jun. 25, 1990, now abandoned.

This invention relates generally to communications with distributed nodes in a computer network, and more specifically with change management in a computer network.

BACKGROUND OF THE INVENTION

One of the main objectives of change management in a computer network is to control the installation and updates to microcode and software application programs at multiple nodes from a central site through telecommunications lines which interconnect them to each other. Typical change management tasks include microcode engineering change and microcode fix distribution; configuration/customization data retrieval, manipulation and distribution; microcode engineering change installation, activation and removal controls; and status reporting for each function.

The central site processor is usually larger and more powerful than the processors at the remote nodes. Skilled data processing personnel are located at the central site, while the remote nodes usually run unattended. When changes have to be made, it is more practical to have them broadcast from the central site to the various distributed sites. Thus, the remote nodes are able to work independently from the host computer at the central site, while at the same time remaining connected to the host computer for file transfer and access to other applications.

In a typical network architecture such as the system network architecture (SNA) of IBM, a remote node called an entry point sends network management data about itself and the resources it controls to a central site called a focal point. Appropriate change management commands are issued from the focal point to the remote nodes. This change management in SNA is well documented in the prior art. For example, see the following: "Managing Changes in SNA Networks", IBM Systems Journal, Vol. 28, No. 2, pp. 260–273 (1989); "SNA Network Management Directions", IBM Systems Journal, Vol. 27, No. 1, pp. 3–14 (1988); and "System-Independent File Management and Distribution Services", IBM Systems Journal, Vol. 28, No. 2, pp. 241–259 (1989). However, in such prior art networks, it has not been practical to have multiple applications serviced by a single entry point. Instead, each application had its own entry point connected through at least one dedicated telecommunications line to a focal point node.

The specifications which describe the format and protocol for the GDS (general data stream) and for the related hierarchy of identifiers for SNA data objects is well known. For example, see "SNA: Format and Protocol Reference Manual: Management Services" SC30-3346; "SNA: Format and Protocol Reference Manual: File Services", SC31-6807; "SNA: Format and Protocol Reference Manual: Distribution Services", SC30-3098; and "SNA: Formats", GA27-3136 (See appendix A respecting description of GDS's). The problem was to utilize these known SNA protocols and formats in connection with SNA/DS, SNA/MS and SNA/FS without having to create all the software/hardware overhead required to establish an entry point for every application in the network.

A previous conventional entry point implementation for SNA was the IBM 3174 communications controller, which implemented a complete SNA solution using SNA/DS, SNA/MA and SNA/FS at the 3174 entry point. However, this previous implementation did not include any sub-entry points.

OBJECTS AND BRIEF SUMMARY OF THE INVENTION

Accordingly, it is an object of the present invention to provide multiple sub-entry points connected to a single entry point so that for purposes of change management, each sub-entry point derives the same functional benefit as an entry point. A related object is to have such a single entry point connected to a central site focal point node with only one telephone line.

Another object of the invention is to create an interface architecture between entry points and sub-entry points which allows widespread network data distribution and processing without creating excessive numbers of entry point nodes. A related object is to minimize the resources that are normally required in an entry point by off-loading portions of the SNA entry point functions to one or more sub-entry points.

An additional object of the invention is to provide flexibility for future enhancements of the architecture. A related object is to make the identifiers passed to a sub-entry point a subset of the actual identifiers received by the entry point, and conversely make the response identifiers passed from a sub-entry point back to an entry point a subset of the actual identifier transmitted back to a focal point.

Still another object is to provide an interface with a sub-entry point which remains unchanged without regard to the type of application receiving the data objects, and without regard to the configuration of the target computer systems on the network.

More specifically, in its preferred form the invention provides a protocol that leaves the SNA/DS (distribution services) function with an entry point, but partitions the SNA/MS (management services) and the SNA/FS (file services) functions between the entry point and a sub-entry point. An application such as VM/DSNX (virtual machine/distributed systems node executive) is provided at the entry point which would handle all change management data and commands that come down over a LU 6.2 conversation from NetView DM (distribution manager). Such a conversation or session involves communications between a focal point node and one or more entry point nodes. After performing the SNA/DS functions of getting the data or command to the node, DSNX would recognize when the data or command pertained to microcode (which DSNX does not know how to handle) and would off-load it via the new interface architecture to a target system service processor or I/O device acting as the application at the sub-entry point. Such application would then perform the majority of the SNA/MS and SNA/FS functions. After the MS and FS processing is completed at the sub-entry point, a communication is sent back to DSNX over the new interface architecture and DSNX would then perform the SNA/DS function of communicating the results back to NetView DM at the focal point node.

The aforementioned objectives and advantages as well as other benefits from the invention will be understood by those skilled in the art in view of the following detailed description and accompanying drawings.

BRIEF DESCRIPTION OF THE DRAWINGS

FIG. 2 shows in tabular form the various network change management functions typically required to perform change management from a central site focal point node;

FIG. 3 shows in tabular form two exemplary types of data objects used in a presently preferred embodiment of the invention;

FIG. 4 shows in tabular form the different states in which the data objects of FIG. 3 can exist;

FIG. 8 shows exemplary hierarchical identifiers for the ACCEPT command received at an entry point:

FIG. 9 shows pass-through identifiers and new identifiers for the ACCEPT command received at a sub-entry point;

FIG. 11 is a flow chart showing a handshaking method used in the sub-entry point architecture of the present invention to perform an unsuccessful INSTALL function and FIG. 12 shows an exemplary list of various new hierachical identifiers used in the preferred embodiment.

DETAILED DESCRIPTION OF A PREFERRED EMBODIMENT

Generally speaking, the sub-entry point architecture of the present invention operates in an existing network architecture environment such as SNA. In such a network, canonical names are global names used to identify the various data objects which constitute the changes transmitted from a central site focal point node to an entry point node of a target system. In some instances, a group of data objects is called corequisite because they are installed, removed and accepted together. In that regard, corequisite data objects must always be in the same state at any given point in time. Although the data objects can be any logical group of files, the most typical data objects of the presently preferred embodiment of the invention is a microcode engineering change.

Figure 1:
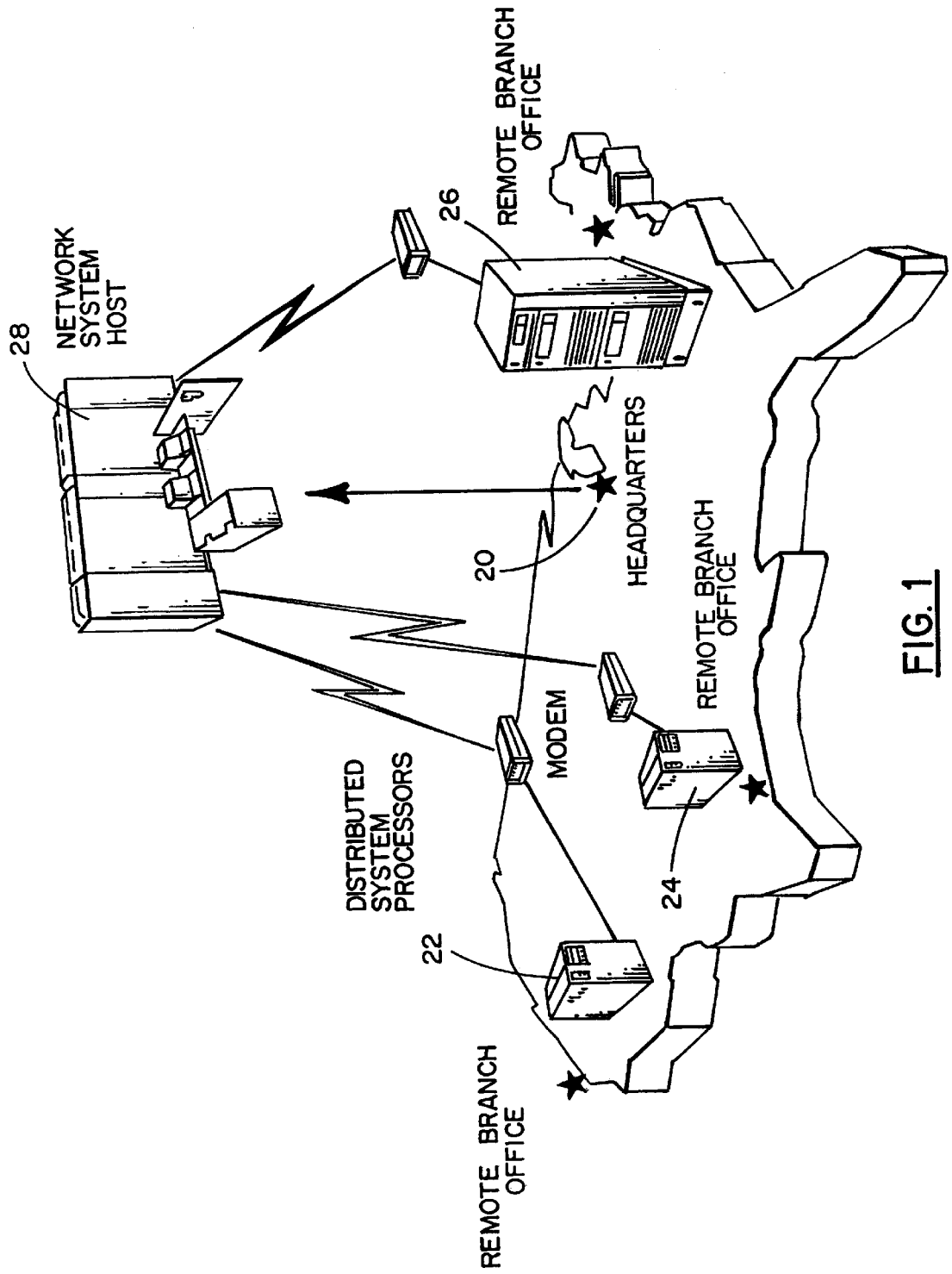
FIG. 1 is a schematic diagram showing a typical computer network.

In a typical network environment used for installation of the invention (See FIG. 1), a software product such as NetView Distribution Manager (NDM) runs at the central site node 20 in support of change management tasks. NDM provides control for distributing data objects and installing them on distributed processors 22, 24, 26. Software at the distributed nodes execute the commands received from NDM. Tracking of these activities and handling of exceptional conditions takes place at the host computer 28 operating at the central site, thereby allowing the remote nodes to operate in unattended mode.

Another software product such as DSNX runs at the entry point node and works in partnership with NDM to distribute software and microcode changes from the central site to remote target systems. The DSNX software product does its work in a manner transparent to system users. Since DSNX is designed to execute in a system with an unattended operator console, the central site has total authority for managing and controlling resources.

NDM uses three existing SNA protocols to communicate with the remote nodes through an access method such as ACF/VTAM (advanced communications functions for the virtual telecommunications access method). ACF/VTAM sends and receives data from system to system on behalf of application programs. The SNA protocols are as follows:

SNA/DS is a connectionless service that uses the transport layer of SNA to perform the actual transfer of data through LU 6.2 sessions. Individual data items flowing on these sessions are known as SNA/DS objects, which include large objects such as load modules and small objects such as commands.

SNA/MS provides change management capabilities for planning, scheduling and tracking changes from a central site focal point node to entry point nodes.

SNA/FS works with SNA/DS to move files from one location to another. In order to do this, SNA/FS defines the file-fetching and storing services that are provided across the network, plus a naming scheme that provides the unique canonical global names for individual files across the networks.

In the preferred embodiment of the present invention, the microcode data objects fall into two categories (see FIG. 3):

MCODE identifies a functional microcode category containing the base operating microcode for a target system, and typically includes so-called microcode patches or fixes which would apply to multiple target systems in the network.

MCUST identifies a customization microcode category containing parameters for the specific operating system and/or a specific configuration of a target system in the network. Data objects in this category are created to tailor the operation of MCODE to the particular environment of the target system. SNA/MS can be considered to own the MCODE and MCUST canonical names with the global naming convention provide by SNA/FS, but it is SNA/FS and SNA/DS together that provide the data transfer mechanism for change management in the network using LU 6.2 conversations.

As shown in FIG. 4, in the preferred embodiment provides two storage spaces for each type of microcode data object, so that a microcode data object in a production state P in a target system can coexist with a related microcode data object in one of the other states of empty E, unlabeled U, trial T, or backup B. If there is not a required microcode object resident in a production state on the target system, then the system is inoperative.

The various functions found in the SNA network architecture (see FIG. 2) are used to manipulate microcode data objects in the target system. In the illustrated embodiment of the invention, it is to be noted that there are two options for the INSTALL function—it is done either at a P level or at a T level. If the INSTALL is an "install without send", then a previously sent data object is made either a P or T level. If the INSTALL is an "install and send", then a data object that is sent with the install command is made either a P or T level. Where the INSTALL is done as P (production), the previous production level becomes the backup B or is removed. If the INSTALL is done as T (trial), the previous production level remains as production P.

Figure 5:
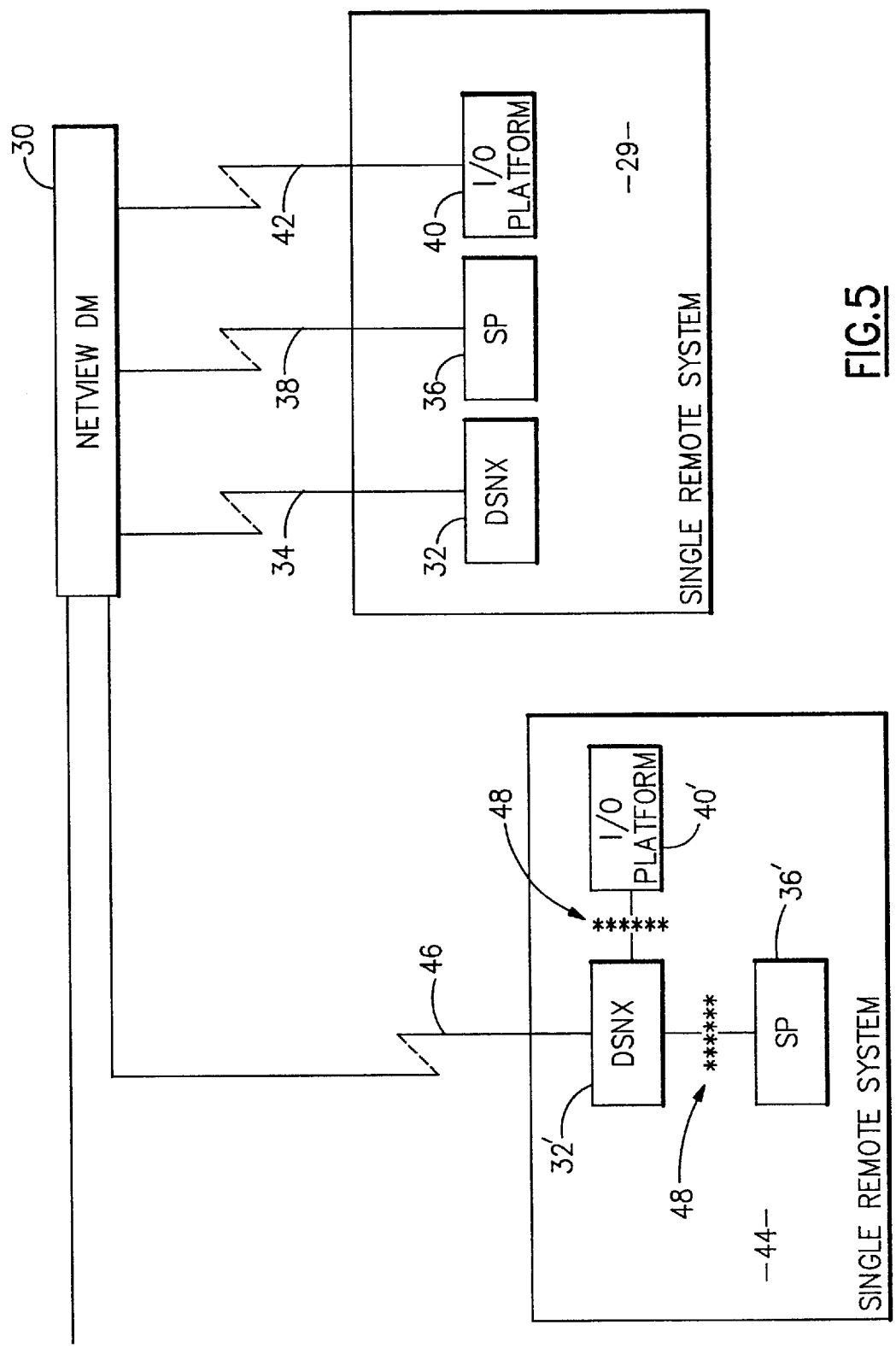
FIG. 5 is a high level schematic block diagram showing a computer network having both conventional entry point architecture, as well as the sub-entry point architecture of the present invention.

Under the technology in use prior to the present invention, the existence of multiple applications at a single distributed system 29 would require a separate telecommunications line for each application. Thus, as shown in FIG. 5, a NDM 30 would communicate with a DSNX application 32 through line 34, and with a service processor SP application 36 through line 38, and with an I/O platform 40 through line 42. However, when the invention is implemented at another single distributed system 44 having similar applications 32', 36', and 40' as were found in system 29, only a single line 46 is required for transmitting the GDS (general data stream) back and forth between the NDM 30 and the single distributed system 44. More specifically, the modified DSNX application 32' acts as an entry point from the point of view of the network, but in fact it downloads a significant portion of its entry point function to each application through an interface architecture 48. It is important to note that the interface architecture 48 is the same even though the applications 36' and 40' will receive different data objects through the entry point 32'. Thus, multiple applications are able to receive change management data objects over the network through a single entry point which can service one or more sub-entry points.

Figure 6:
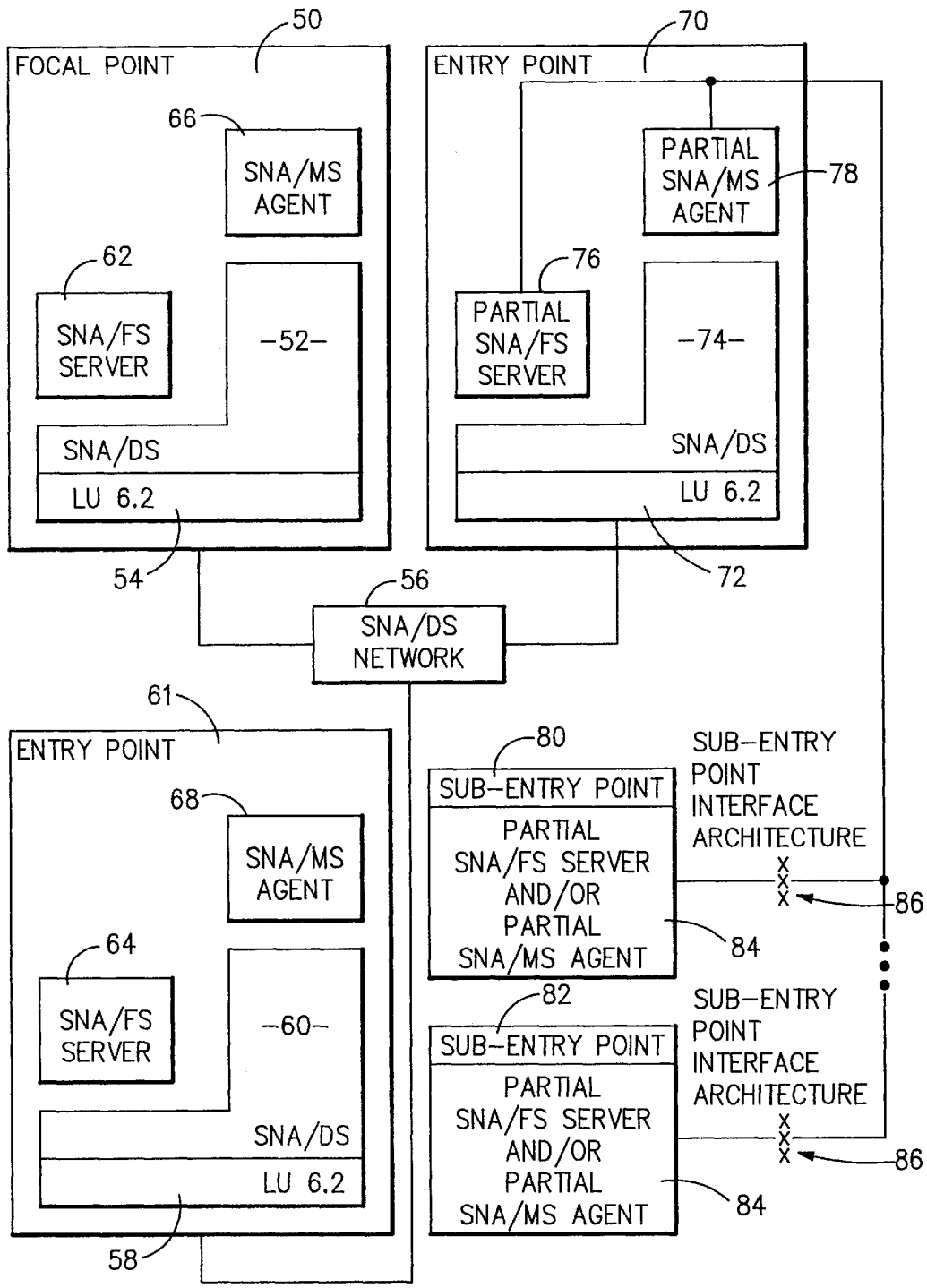
FIG. 6 is a more detailed block diagram of the computer network of FIG. 5.

Referring to FIG. 6, a focal point 50 has the usual three SNA facilities provided by the SNA architecture. More specifically, an SNA/DS component 52 uses a communication protocol such as an LU (logical unit type) 6.2 facility 54 in order to exchange data through a SNA/DS network 56 with another LU 6.2 facility 58 and its associated SNA/DS component 60 located at a conventional entry point 61. A SNA/FS server 62 in the focal point 50 has a corresponding component 64 at the entry point, while a SNA/MS agent 66 in the focal point 50 has its corresponding component 68 at the entry point.

In contrast, the invention provides a unique entry point 70 which is in fact a hybrid. With respect to the SNA/DS network 56, it appears to be a conventional entry point, having the usual LU 6.2 facility 72 as well as an SNA/DS component 74 for exchanging data with the focal point 50. In fact, however, such hybrid entry point 70 has only a partial SNA/FS server 76 and a partial SNA/MS agent 78, with the rest of the required entry point functions handled at sub-entry points 80, 82 each having a partial SNA/FS server and/or partial SNA/MS agent facility 84. There is no limit to the number of sub-entry points connected to a hybrid entry point, so long as a standard sub-entry point interface architecture 86 is used with each sub-entry point.

Thus, the invention uses existing SNA protocols for distribution services (DS), file services (FS) and management services (MS) in connection with new protocols used in the interface between a hybrid entry point and multiple sub-entry points. The result is the off-loading of work from an entry point to a sub-entry point, thereby allowing a sub-entry point to have the same benefits that accrue to a conventional entry point without the need for the full resource and capability required for a conventional entry point. Conversely, by partitioning the hybrid entry point's SNA/MS and SNA/FS functions between the hybrid entry point and a sub-entry point, there is less resource and capability required at the hybrid entry point.

As a result of the invention, an application running at a sub-entry point contains the intelligence and resources needed to handle most of the SNA/MS and SNA/FS functions, while the hybrid entry point handles only the SNA/DS functions and a minimal portion of the SNA/MS and SNA/FS functions. Of course, any SNA functions not handled at the hybrid entry point are off-loaded to the sub-entry point for processing. As part of the new interface architecture with a sub-entry point, some additional identifiers are used to facilitate the handshaking and dialog between a hybrid entry point and its sub-entry points, as discussed in more detail below.

Also, it will be appreciated by those skilled in the art that the invention is not limited to DSNX as the catcher at a hybrid entry point for handling all change management data and commands that come down during a communications session such as LU 6.2 from a control program such as NetView DM (NDM). Other software/hardware facilities can be used to achieve the shared SNA function between a hybrid entry point and its connected sub-entry points, all within the spirit of the invention.

After the SNA/MS and SNA/FS functions are completed at the sub-entry point, a communication is sent back through the interface architecture 86 to the hybrid entry point, and a facility such as DSNX would perform the SNA/DS function of communicating the results back up to NDM at the focal point node 50.

It is important to emphasize that the new sub-entry point interface architecture does not affect the focal point. The same focal point resource and communication to an entry point is required whether it is talking to a convention entry point 61 having no sub-entry points or to a hybrid entry point 70 which has sub-entry points 80, 82. The focal point always talks directly to the entry point agent, and the focal point does not know whether or not this is a hybrid entry point which is off-loading work to sub-entry point agents.

Also, it is very important to understand that these sub-entry point applications are not limited to processing microcode. They can be designed to handle almost any kind of object that can be or needs to be handled by an application other than one running at the entry point. It is also important to understand that the new interface architecture is generic enough to be used between any two applications running in an entry point and a sub-entry point.

Figure 7:
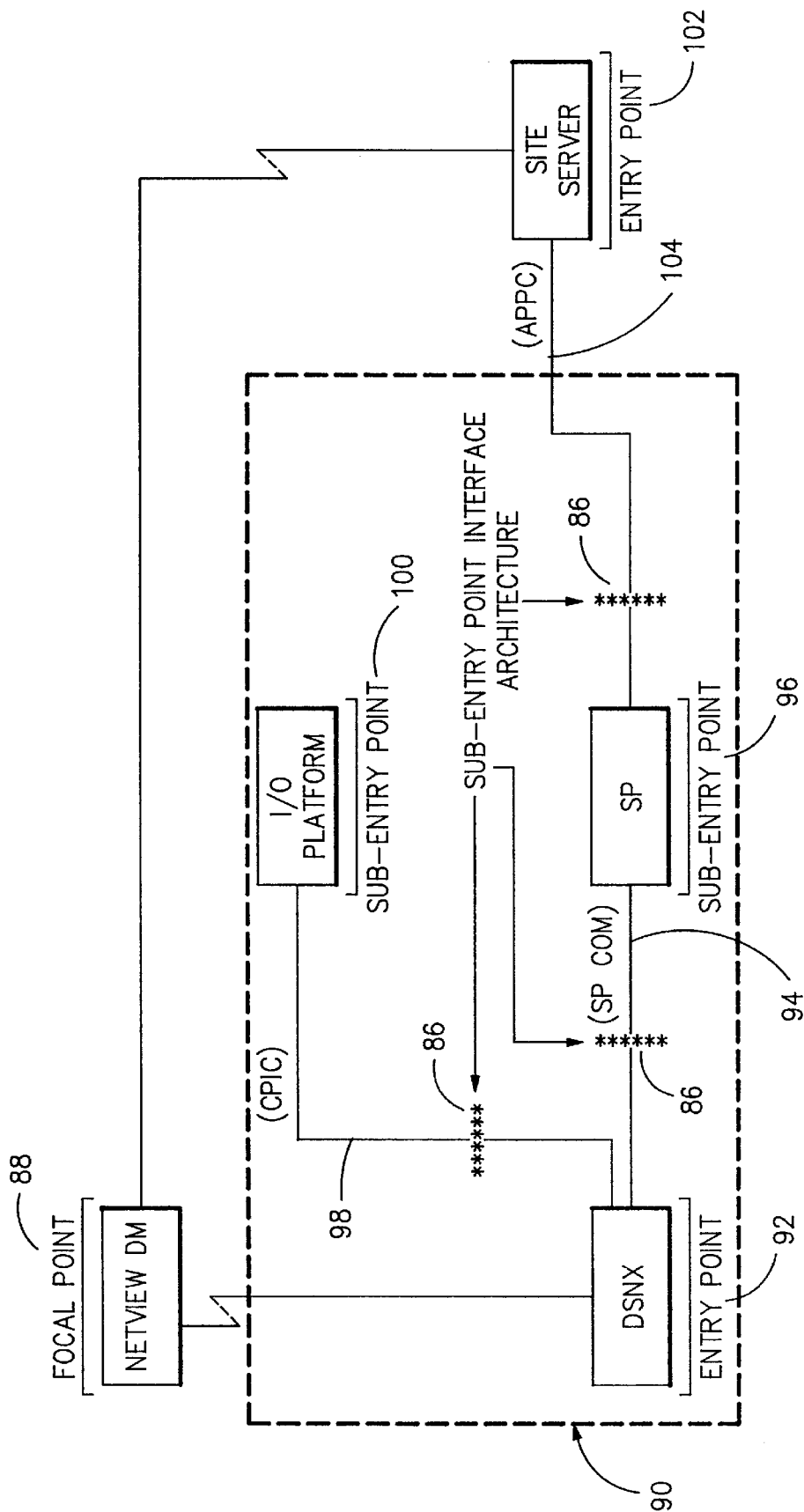
FIG. 7 is a schematic diagram showing how the sub-entry point architecture of the present invention can be implemented with different interface environments.

Referring to FIG. 7, a network is shown with a focal point 88 connected through a network to a single remote system 90. The remote target system 90 includes a hybrid entry point 92 connected through an SP communication path 94 to a sub-entry point 96 (a service processor), and through a different CPIC (common programming interface communication) communication path 98 to another sub-entry point 100 (an I/O platform). Also shown is a hybrid entry point 102 which provides an APPC (advanced program-to-program communication) communication path 104 to sub-entry point 96. It is noted that the DSNX catcher in hybrid entry point 92 is different from the site server catcher at hybrid entry point 102. Nevertheless, the same interface architecture 86 is used to provide for intercommunications between an entry point and a sub-entry point. So the new interface architecture is independent of the type of communications path used between an entry point, and its sub-entry points. In other words, we do not rely on the communications path to control the transfer of data.

FIGS. 8 and 9 show how an input GDS received by a hybrid entry point is processed, with a subset of the actual input passed to the sub-entry point. By not changing the data/commands passed between the hybrid entry and sub-entry points, it is possible to have maximum flexibility for future enhancements of the SNA architecture. In addition to the SNA subset passed to the sub-entry point, new interface identifiers 104 are provided to enhance the intercommunications and handshaking between a hybrid entry point and its sub-entry points. In the specific illustrated embodiment, the catcher at the hybrid entry point is DSNX, and the sub-entry point is a service processor (SP) for a distributed computer system.

The processing for an ACCEPT command proceeds as follows. The SNA/DS layer provides asynchronous movement of data from one user to one or more other users. This service is provided for distributive service units interconnected by an LU 6.2 conversation. The SP cannot handle LU 6.2 due to lack of resource. Therefore, in this exemplary embodiment, DSNX processes the entire DS layer of an input GDS (generalized data stream). The SNA/MS layer provides a change management command. This layer is for the most part handled by the SP. The SNA/FS layer provides data object handling instructions but does not deal with the actual command handling. This layer is processed by both DSNX and the SP. For instance in the example shown in FIG. 8, the SP would verify that the "stored canonical name" identifying the data object to accept, does exist. However, the "server request prefix" is verified by DSNX who, acting as the agent, knows that a "decode" instruction is the only valid value for this command.

FIG. 8 shows how an input GDS for the ACCEPT command would look to DSNX, and FIG. 9 shows how the same ACCEPT command looks to the SP. Of course, the GDS contains lengths, identifiers and data in a hierarchical fashion as defined by the existing SNA architectures. In the example of FIGS. 8 and 9, only major identifiers are shown, and some "child" identifiers have been left off to simplify the example.

When the processing of the GDS for the ACCEPT command is completed, the SP will provide a subset of the entire output GDA back to DSNX so it can be incorporated in the final GDS report prepared by DSNX for transmission back to the focal point.

Figure 10B:
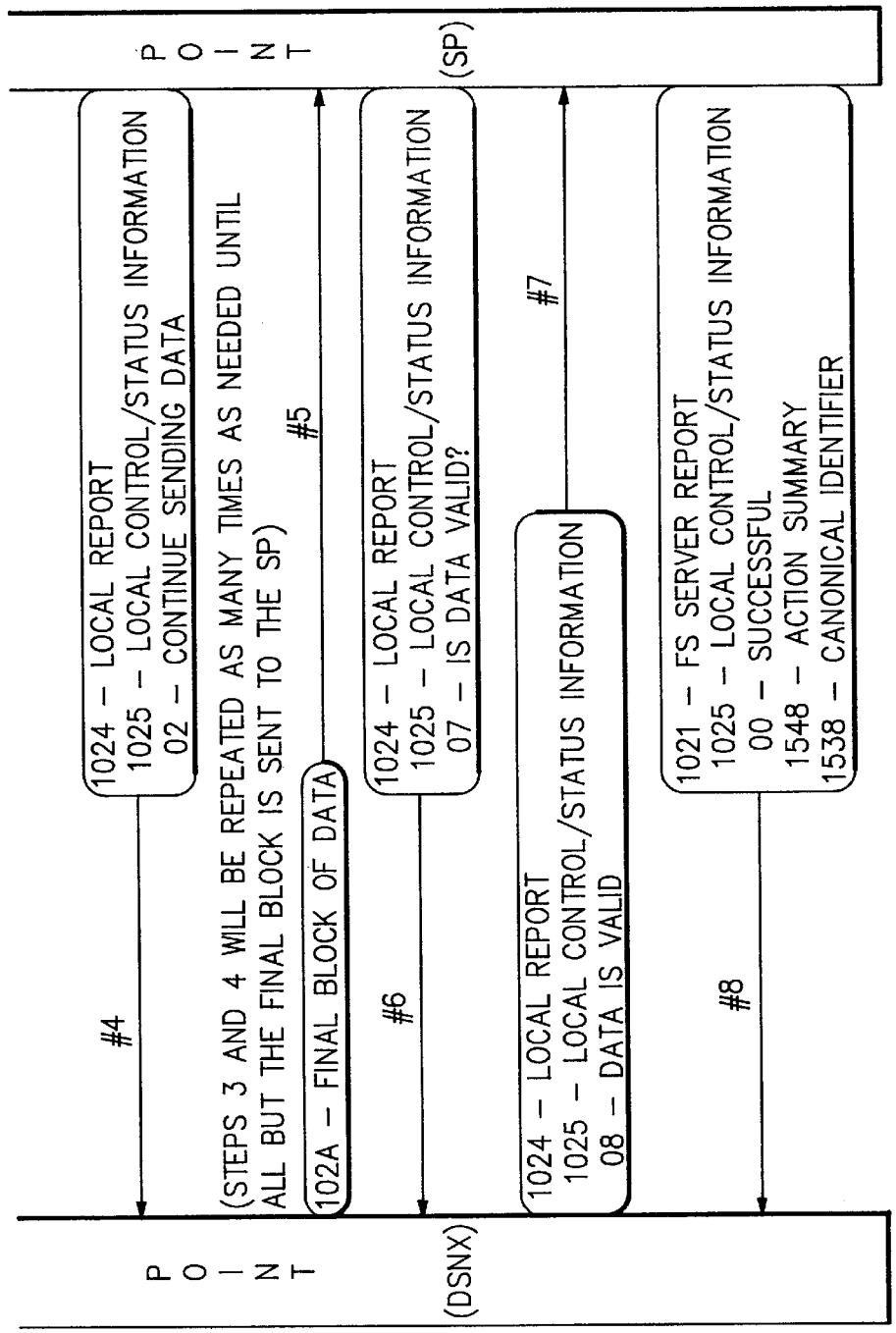
FIG. 10 is a flow chart showing a handshaking method used in the sub-entry point architecture of the present invention to perform a successful SEND function.
Figure 11:
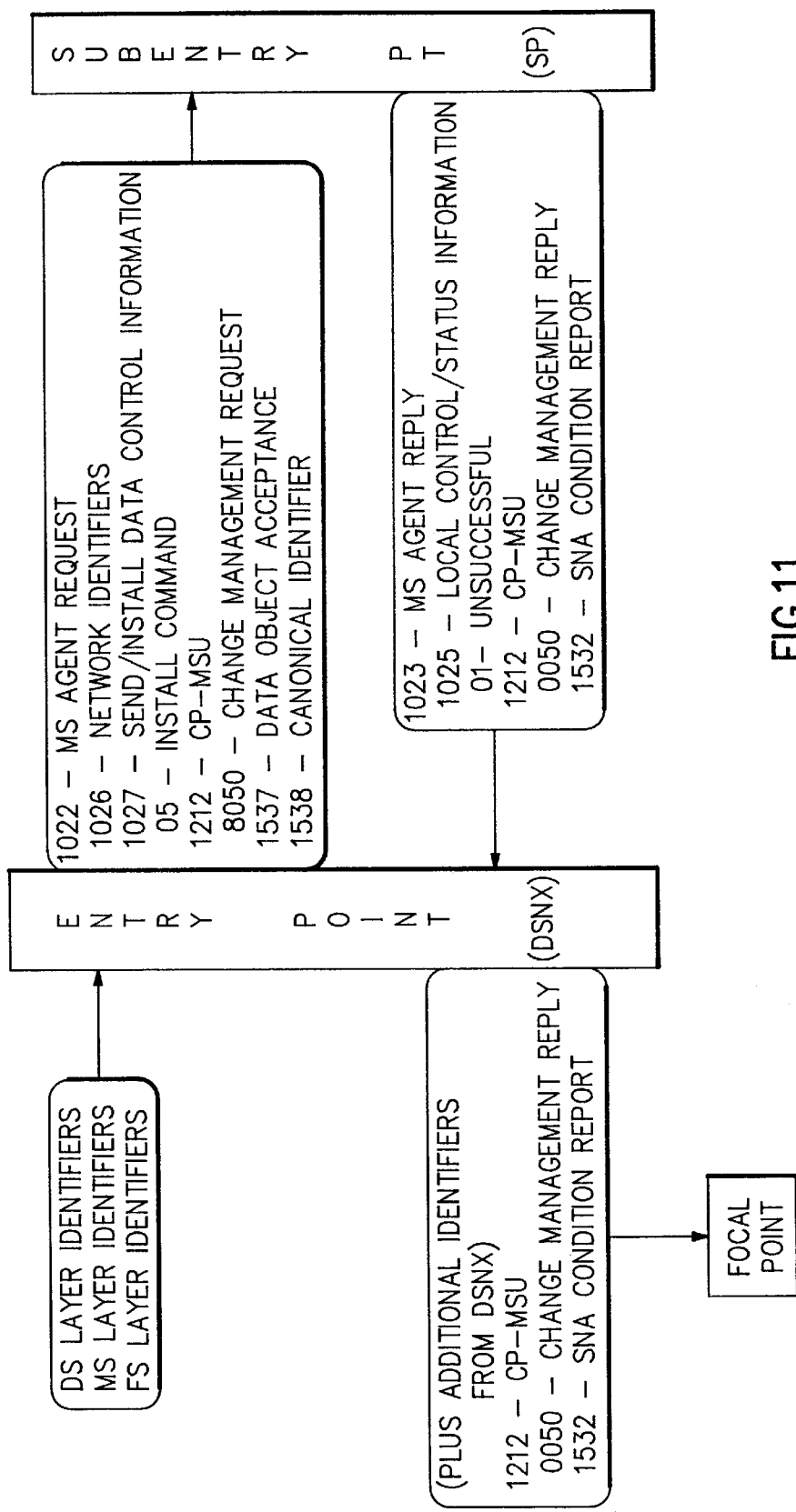

The new identifiers 104 provide additional function to facilitate the processing of the GDS by the SP at the sub-entry point. One such function is the handshaking method for transferring data and for controlling the processing. This handshaking method allows for abort/cancel of transfer data, such as shown in FIG. 11 where an error was found in connection with an INSTALL command. This handshaking method also handles a more complicated transaction such as the SEND command as shown in FIG. 10. Another such function is a data control method for the SEND and SEND_AND_INSTALL commands. This data control method allow DSNX to perform command parameter verifications before actually sending the data to the SP. Another such function is obtaining network information from the DS layer. Thus, network information is provided in the "network identifiers" vector 106 as indicated in FIG. 9.

It is important to note that the invention is not limited to the specific interface architecture developed as part of this invention, but to any architected interface which allows a hybrid entry point to offload part of the function to multiple sub-entry points. Nevertheless, it is believed that the hierarchy of new identifiers, as shown on FIG. 12, provide a preferred list of additional function which serve to implement the benefits of the present invention.

Of course, other changes, modifications and revisions are possible within the spirit of the invention, and are intended to be included within the scope of the invention as defined by the following claims.

What is claimed is:

1. A computer network for exchanging data objects between different nodes in the computer network, comprising:

at least one sender node;

a receiver node which runs a plurality of applications and which is coupled to said at least one sender node for receiving control and data communications from said sender node and verifying that components of said control and data communications are consistent with each other, said receiver node including:

(a) a hybrid entry point having at least one of a server and an agent for performing entry point functions corresponding to a first one of said applications, and (b) at least one sub-entry point coupled to said hybrid entry point and having at least one of a server and an agent for performing entry point functions corresponding to a second one of said applications, wherein said hybrid entry point routes at least part of said control and data communications to said at least one sub-entry point based on information in said control and data communications, and wherein data objects which are included in said control and data communications and which correspond to said plurality of applications are input into said receiver node along a single communications line.

2. The computer network of claim 1 further comprising pass-through means for transmitting a subset of said control and data communications from said hybrid entry point to said at least one sub-entry point without changing the format of said subset.

3. The computer network of claim 2 wherein said pass through means includes identifier means for adding additional information to said subset of said control and data communications which is transmitted to said at least one sub-entry point.

4. The computer network of claim 1 wherein said at least one sender node and said receiver node communicate in accordance with SNA architecture.

5. The computer network of claim 1 wherein said control communication includes an instruction and a prefix for said instruction, and said receiver node determines if said instruction is consistent with said prefix.

* * * * *